United States Patent
Hu et al.

(10) Patent No.: US 7,864,699 B2
(45) Date of Patent: Jan. 4, 2011

(54) METHOD AND DEVICE FOR INFORMATION TRANSFER

(75) Inventors: Weihua Hu, Shenzhen (CN); Wenfu Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 12/840,608

(22) Filed: Jul. 21, 2010

(65) Prior Publication Data

US 2010/0278116 A1    Nov. 4, 2010

Related U.S. Application Data

(63) Continuation of application No. 12/704,868, filed on Feb. 12, 2010.

(30) Foreign Application Priority Data

Aug. 15, 2007   (CN) .................. 2007 1 0146763
Jul. 31, 2008   (CN) ............... PCT/CN2008/071839

(51) Int. Cl.
*H04W 4/00* (2009.01)
*H04W 36/00* (2009.01)
*H04J 3/22* (2006.01)

(52) U.S. Cl. .................. 370/252; 370/331; 370/466; 455/437

(58) Field of Classification Search .......... 370/250, 370/329, 331, 334, 337, 466, 467; 455/436–440, 455/442–445
See application file for complete search history.

(56) References Cited

U.S. PATENT DOCUMENTS 7,283,497 B2   10/2007   Mueller
7,656,835 B2 *  2/2010   Joutsenvirta et al. ........ 370/328

2003/0153296 A1   8/2003   Müeller
2003/0179753 A1   9/2003   Mercuriali
2005/0076108 A1   4/2005   Li et al.

(Continued)

FOREIGN PATENT DOCUMENTS

CN    1741493 A    3/2006

(Continued)

OTHER PUBLICATIONS

"3rd Generation Partnership Project; Technical Specification Group Services and System Aspects; General Packet Radio Service (GPRS); Service Description; Stage 2 (Release 7)," 3GPP TS 23.060 v7.4.0, (Mar. 2007).

(Continued)

*Primary Examiner*—Aung S Moe
*Assistant Examiner*—Kerri M Rose
(74) *Attorney, Agent, or Firm*—Conley Rose, P.C.; Grant Rodolph

(57) ABSTRACT

A method for information transfer includes: determining, by a source Mobility Management Network Element (MMNE) of a source Access Network (AN), version number of GPRS Tunneling Protocol (GTP) used between the source MMNE and a destination MMNE of a destination AN; and transmitting, by the source MMNE, user information corresponding to the version number of the GTP used between the source MMNE and the destination MMNE to the destination MMNE. The embodiment of the invention also provides a device for information transfer. With the embodiment of present invention, corresponding user information transfer may be realized.

14 Claims, 4 Drawing Sheets

U.S. PATENT DOCUMENTS

2007/0213060 A1    9/2007   Shaheen
2009/0016300 A1*   1/2009   Ahmavaara et al. ......... 370/331

FOREIGN PATENT DOCUMENTS

| CN | 1848845 A    | 10/2006 |
|----|--------------|---------|
| CN | 1849004 A    | 10/2006 |
| CN | 1870652 A    | 11/2006 |
| CN | 1992645 A    | 7/2007  |
| CN | 100479422 C  | 4/2009  |
| EP | 1560381 A2   | 8/2005  |

OTHER PUBLICATIONS

"Position Switching Method and Apparatus," English Translation CN1849004(A) published Oct. 18, 2006, 7 pages.

"Protocol Compatibility Processing Method and Apparatus," English Translation CN1848845(A) published Oct. 18, 2006, 6 pages.

Foreign Communication from a counterpart application, Chinese application 200710146763.7, First Office Action dated May 15, 2009, 3 pages.

Foreign Communication from a counterpart application, Chinese application 200710146763.7, Partial English Translation of First Office Action dated May 15, 2009, 7 pages.

Foreign Communication from a counterpart application, Chinese application 200710146763.7, Second Office Action, pages, 4 pages.

Foreign Communication from a counterpart application, Chinese application 200710146763.7, Partial English Translation of Second Office Action, 3 pages.

Foreign Communication from a counterpart application, Chinese application 200710146763.7, Third Office Action dated May 11, 2010, 4 pages.

Foreign Communication from a counterpart application, Chinese application 200710146763.7, Partial English Translation of Third Office Action dated May 11, 2010, 3 pages.

Foreign Communication from a counterpart application, PCT application PCT/CN2008/071839, International Search Report, dated Oct. 16, 2008, 2 pages.

Foreign Communication from a counterpart application, PCT application PCT/CN2008/071839, International Preliminary Report on Patentability, dated Feb. 16, 2010, 6 pages.

"3rd Generation Partnership Project; Technical Specification Group Services and System Aspects; GPRS Enhancements for E-UTRAN Access (Release 8)," 3GPP TS 23.401, V1.1.0, (Jul. 2007).

"3rd Generation Partnership Project; Technical Specification Group Services and System Aspects; Architecture Enhancements for Non-3GPP Accesses (Release 8)," 3GPP TS 23.402, v1.2.1 (Aug. 2007).

Foreign communication from a counterpart application, European application 08783832.2, Extended European Search Report dated Sep. 29, 2010, 17 pages.

3rd Generation Partnership Project; Technical Specification Group Services and System Aspects; 3GPP System Architecture Evolution: Report on Technical Options and Conclusions (Release 7) 3GPP Standard; 3GPP TR 23.882, 3rd Generation Partnership Project (3GPP), Mobile Competence Centre ; 650, Route Des Lucioles ; F-06921 Sophia-Antipolis Cedex ; France, No. V1.11.0, Jul. 1, 2007, pp. 1-211, XP050364122.

Siemens: "Discussion on 3GPP Anchor Location" 3GPP Draft; S2-063732, 3rd Generation Partnership Project (3GPP), Mobile Competence Centre ; 650, Route Des Lucioles ; F-06921 Sophia-Antipolis Cedex ; France, vol. SA WG2, No. Busan; 20061017, Oct. 17, 2006, XP050257553 [retrieved on Oct. 17, 2006].

Nokia et al: "I-RAT handover principle and flows" 3GPP Draft; S2-071401, 3rd Generation Partnership Project (3GPP), Mobile Competence Centre ; 650, Route Des Lucioles ; F-06921 Sophia-Antipolis Cedex ; France, vol. SA WG2, No. Warsaw; 20070321, Mar. 21, 2007, XP050258584 [retrieved on Mar. 21, 2007].

* cited by examiner

METHOD AND DEVICE FOR INFORMATION TRANSFER

CROSS-REFERENCE TO RELATED APPLICATIONS

This application is a continuation of U.S. patent application Ser. No. 12/704,868, filed on Feb. 12, 2010, which is a continuation of International Application No. PCT/CN2008/071839, filed on Jul. 31, 2008, which claims priority to Chinese Patent Application No. 200710146763.7, filed on Aug. 15, 2007, all of which are hereby incorporated by reference in their entireties.

FIELD OF THE TECHNOLOGY

The present invention relates to the field of wireless communication, and more particularly, to a method and device for information transfer in wireless communication.

BACKGROUND

To increase the competence of the future network, Third Generation Partnership Project (3GPP) is developing a brand new evolved network, which is also referred as an Access Network (AN) of Release 8 (R8) or later versions herein.

Under the system architecture of the current AN, that is, under the system architecture of the AN of Release 7 (R7) or earlier versions, the procedure for inter-/intra-system handover and change is substantially the same as that of R8 or later versions with the difference that, in the R7 or earlier versions, when a source Mobility Management Network Element (MMNE) transmits a Forward Relocation Request message or a Context Response message to a destination MMNE, a Packet Data Protocol (PDP) context/bearer context information of R7 or earlier versions includes IP address and Tunnel Endpoint Identity (TEID) information of a Packet Data Network Gateway (P-GW), and the destination MMNE directly transmits an Update Bearer Request message to the P-GW and receives an Update Bearer Response message from the P-GW.

The above difference is due to the following reason: in the AN of R8 or later versions, a user equipment (UE) uses two user plane gateway devices, one is a Serving-Gateway (S-GW) and the other is a P-GW. The S-GW is the user plane anchor point of the 3GPP access network, which is also referred to as the Serving-Gateway entity or the user plane anchor point corresponding to ANs of higher versions. The P-GW is the anchor point between the 3GPP access network and non-3GPP access networks, which is also referred to as Packet Data Network Gateway entity or the user plane anchor point corresponding to ANs of lower versions. Therefore, the PDP context/bearer context of the UE includes information of such two user plane anchor points, that is, information of the S-GW and P-GW, such as address and TEID of the S-GW, and address and TEID of the P-GW. However, in the AN of R7 or earlier versions, the UE uses one user plane gateway device, i.e. the Gateway General Packet Radio Service (GPRS) Supporting Node (GGSN), which is responsible for interfacing with external networks and implementing user plane data transfer. The GGSN is the user plane anchor point between the 3GPP networks of R7 or earlier versions and is equivalent to P-GW in the architecture of an embodiment of present invention. Therefore, the PDP context/bearer context of the UE includes the information of this anchor point, i.e. the information of P-GW, such as address and TEID of the P-GW.

Thus a problem is raised, that is, when handover/changing occurs between an AN of R8 or later versions and that of R7 or earlier versions, how does the source AN correctly transmit the user plane anchor point information needed by the destination AN?

The prior art described above also has the following drawbacks: the PDP context/bearer context Information Element (IE) carried in the Forward Relocation Request or Context Response by the source AN also carries information such as Quality of Service (QoS). In the AN of R8 or later versions, when the source MMNE transmits the Forward Relocation Request or Context Response message to the destination MMNE, the format and parameters of the information, such as QoS, carried in the PDP context/bearer context is the format and parameters of the information for R8 or later versions, while the destination MMNE of R7 or earlier versions may be unable to identify such format and parameters, thus the PDP context/bearer context IE transferred by the source MMNE of R8 or later versions may not be processed.

It can be seen from the above description that, when a user hands over or changes between networks of different versions, the source AN cannot transfer information of the user.

SUMMARY

An embodiment of the invention provides a method and device for information transfer, which may transfer corresponding information of a user when the user hands over or changes between access networks of different versions.

The technical solution according to the embodiments of the invention is realized as follows:

A method for information transfer includes: transmitting, by a source Mobility Management Network Element (MMNE) of a source Access Network (AN), both user information corresponding to a lower version AN and user information corresponding to a higher version AN to a destination MMNE of a destination AN, when the source AN is of higher version.

A method for information transfer includes: determining, by a source Mobility Management Network Element (MMNE) of a source Access Network (AN), a version number of GPRS Tunneling Protocol (GTP) used between the source MMNE and a destination MMNE of a destination AN; and transmitting, by the source MMNE, user information corresponding to the version number of the GTP used between the source MMNE and the destination MMNE to the destination MMNE.

A device for information transfer includes: an Information Element (IE) generation module (401), configured to generate an IE carrying user information, the user information including both user information corresponding to a lower version Access Network (AN) and user information corresponding to a higher version AN; and a transmission module (402), configured to transmit the IE generated by the IE generation module (401) to a destination Mobility Management Network Element (MMNE).

A device for information transfer includes: a determination module (501), configured to determine a version number of GPRS Tunneling Protocol (GTP) used between a source Mobility Management Network Element (MMNE) and a destination MMNE, and to transmit a determination result to an Information Element (IE) generation module (502); the IE generation module (502), configured to generate an IE carrying user information, the user information including user information corresponding to the version number of GTP used between the source MMNE and the destination MMNE;

and a transmission module (503), configured to transmit the IE generated by the IE generation module (502) to the destination MMNE.

It can be seen from the above technical solutions that, with the method and device for information transfer according to the embodiments of the present invention, the source MMNE transmits both the user information corresponding to the lower version AN and the user information corresponding to the higher version AN to the destination MMNE; or alternatively, it directly transmits the user information corresponding to the version of the destination AN to the destination MMNE. As a result, the needed information may be correctly received regardless of the version of the AN. Thus, when the user hands over or changes between ANs of different versions, the transfer of the user information may be achieved with the method and device for information transfer according to the embodiments of the present invention.

DETAILED DESCRIPTION

To make the objects, technical solutions and advantages of the embodiment of the invention more apparent, the embodiment of present invention will be described in detail with reference to the drawings in the following.

Figure 1:
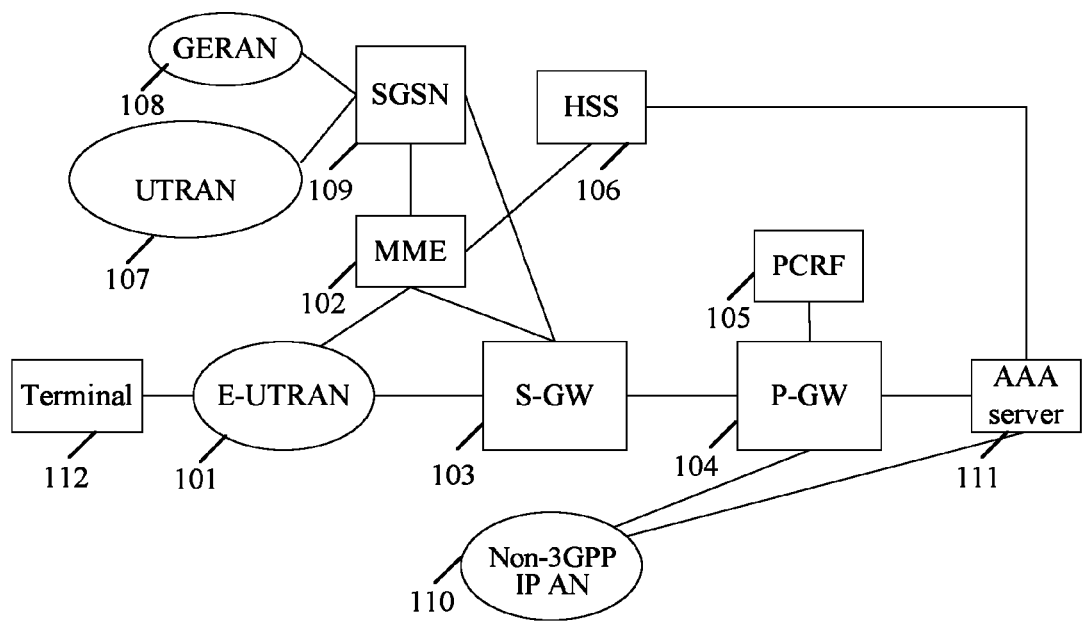
FIG. 1 illustrates a system architecture of a brand new evolved network.

First of all, the system of the brand new evolved network will be described. Please refer to FIG. 1, which illustrates the system architecture of the brand new evolved network. The evolved network includes an Evolved Universal Mobile Telecommunications System (UMTS) Terrestrial Radio Access Network (E-UTRAN) 101 configured to realize all the radio-related functions of the evolved network; a Mobility Management Entity (MME) 102 which is responsible for mobility management in the control plane including user context and mobile state management and user temporary identity allocation; a Serving Gateway (S-GW) 103 which is the user plane anchor point between the 3GPP ANs and is an interface for terminating the E-UTRAN 101; a Packet Data Network Gateway (P-GW) 104 which is the user plane anchor point between the 3GPP AN and the non-3GPP AN, and is an interface configured to terminate an external Packet Data Network (PDN); a Policy and Charging Rule Function (PCRF) 105 which is used for functions of policy control decision and traffic charging control; a Home Subscriber Server (HSS) 106 configured to store user subscription information; a UMTS Terrestrial Radio Access Network (UTRAN) 107 and a GSM/EDGE Radio Access Network (GERAN) 108 configured to realize all the radio-related functions in the existing GPRS/UMTS networks; a Serving GPRS Support Node (SGSN) 109 configured to realize functions such as route forwarding, mobility management, session management and user information storage in the GPRS/UMTS network; a Non-3GPP IP Access Network 110 which is an AN defined by some non-3GPP organizations, such as Wireless Local Area Network (WLAN), Worldwide Interoperability for Microwave Access (Wimax), Code Division Multiple Access (CDMA) networks; and an Authentication, Authorization and Accounting Server (AAA Server) 111 configured to perform functions of authentication, authorization and accounting for a UE 112.

This architecture is illustrative but not limitative of the system architecture of the evolved network, and the real architecture may be different from the above exemplary architecture.

When a source AN transmits user information to a destination AN, if the source AN is of lower version, such as R7 or earlier versions nowadays, the user information transmitted from the source AN to the destination AN is user information corresponding to the lower version AN; while if the source AN is of higher version, such as R8 or later versions nowadays, the user information transmitted from the source AN to the destination AN is both the user information corresponding to the lower version AN and the user information corresponding to the higher version AN.

A case where the user information is user plane anchor point information will be discussed first. In the following embodiments, the procedure for transferring user plane anchor point information between ANs of different versions will be described with reference to the inter/intra-system change and handover procedure. When the source AN is a lower version AN, that is, an AN of R7 or earlier versions, the user plane anchor point information is user plane anchor point information corresponding to the AN of R7 or earlier versions, that is, the P-GW information. When the source AN is a higher version AN, that is, an AN of R8 or later versions, the user plane anchor point information is user plane anchor point information corresponding to the AN of R8 or later versions, that is, both the S-GW and P-GW information.

Embodiment One

Figure 2:
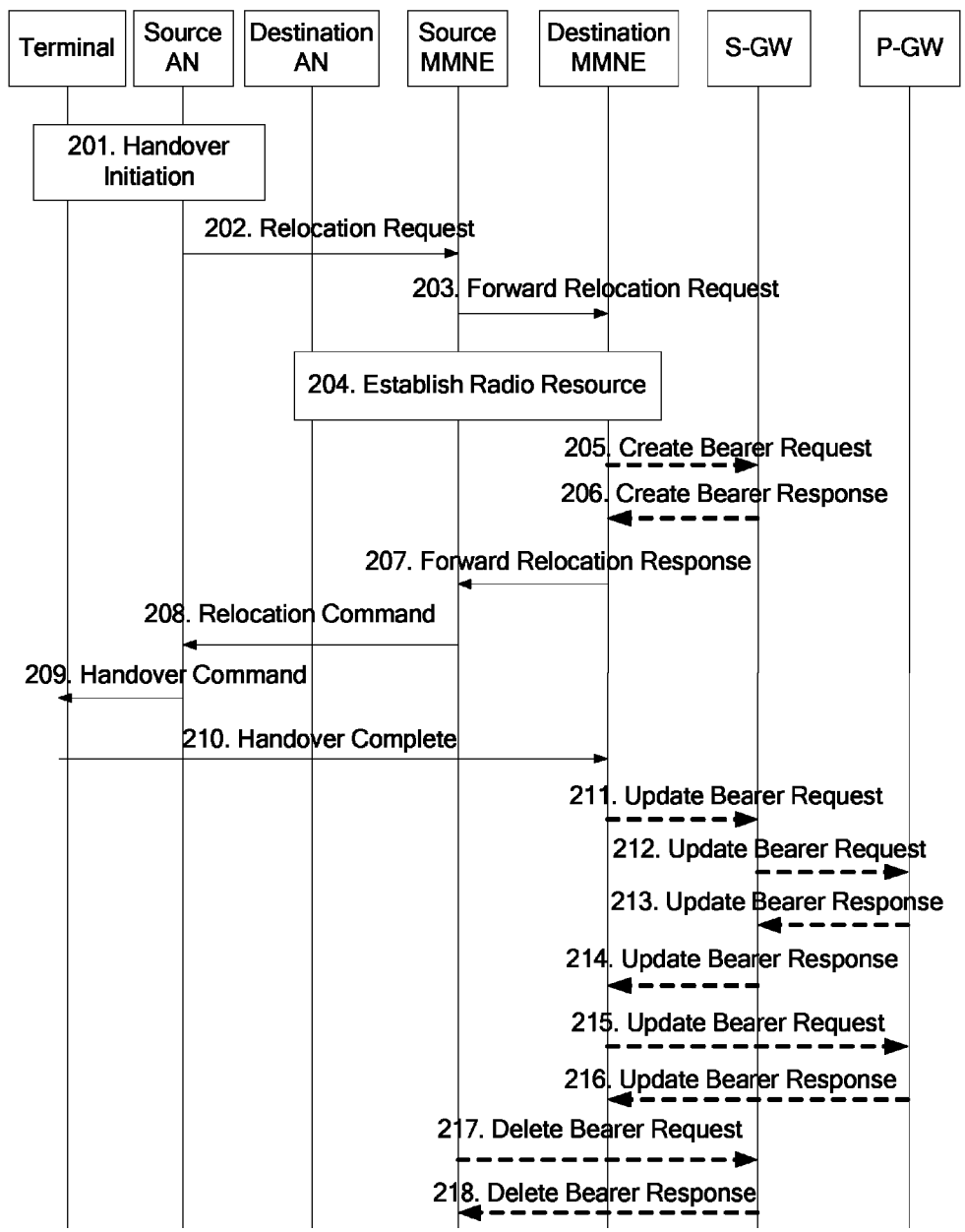
FIG. 2 is a flow chart of a user plane anchor point processing method for realizing handover between ANs of different versions according to a first embodiment of the invention.

FIG. 2 is a flow chart of a user plane anchor point processing method for realizing handover between ANs of different versions according to the first embodiment of the present invention. As shown in FIG. 2, the method mainly includes the following steps:

Step 201: A source access network element (SANE) initiates a handover to hand a UE over to a destination AN. If the source AN is the GERAN, the SANE will be a base station controller (BSC). If the source AN is the UTRAN, the SANE will be a radio network controller (RNC). If the source AN is the EUTRAN, the SANE will be an evolved NodeB (ENodeB).

Step 202: The SANE transmits a Relocation Request message to a source MMNE. If the source AN is the GERAN/UTRAN, the source MMNE will be an SGSN. If the source AN is the EUTRAN, the source MMNE will be an MME.

Step 203: The source MMNE transmits a Forward Relocation Request message to a destination MMNE. If the destination AN is the GERAN/UTRAN, the destination MMNE will be the SGSN. If the destination AN is the EUTRAN, the destination MMNE will be the MME.

If the source AN is of R8 or later versions, the source MMNE carries in the Forward Relocation Request message two PDP context/bearer context Information Elements (IEs). One of the PDP context/bearer context IEs is a PDP context/bearer context IE of R8 or later versions, the other PDP context/bearer context IE is a PDP context/bearer context IE of R7 or earlier versions. The PDP context/bearer context IE of R8 or later versions carries the user plane anchor point information of the AN of R8 or later versions, such as address and TEID information of the S-GW and address and TEID information of the P-GW. The PDP context/bearer context IE of R7 or earlier versions carries the user plane anchor point information of the AN of R7 or earlier versions, such as address and TEID information of the P-GW.

The PDP context/bearer context IE of R7 or earlier versions includes information as shown in the following table.

| 8 | 7 | 6 | 5 | 4 | 3 | 2 | 1 |
|---|---|---|---|---|---|---|---|
| Type = 130 (Decimal) | | | | | | | |
| Length | | | | | | | |
| Uplink Tunnel Endpoint Identifier Control Plane | | | | | | | |
| Uplink Tunnel Endpoint Identifier Data I | | | | | | | |
| GGSN Address for control plane Length | | | | | | | |
| GGSN Address for control plane [4 . . . 16] | | | | | | | |
| GGSN Address for User Traffic Length | | | | | | | |
| GGSN Address for User Traffic [4 . . . 16] | | | | | | | |

Here the GGSN indicates the P-GW described in the embodiment of present invention.

The PDP context/bearer context IE of R8 or later versions includes information as shown in the following table.

| 8 | 7 | 6 | 5 | 4 | 3 | 2 | 1 |
|---|---|---|---|---|---|---|---|
| Type = 182 (Decimal) | | | | | | | |
| Length | | | | | | | |
| Uplink S-GW Tunnel Endpoint Identifier Control Plane | | | | | | | |
| Uplink S-GW Tunnel Endpoint Identifier Data I | | | | | | | |
| Uplink P-GW Tunnel Endpoint Identifier Control Plane | | | | | | | |
| Uplink P-GW Tunnel Endpoint Identifier Data I | | | | | | | |
| S-GW Address for control plane Length | | | | | | | |
| S-GW Address for control plane [4 . . . 16] | | | | | | | |
| S-GW Address for User Traffic Length | | | | | | | |
| S-GW Address for User Traffic [4 . . . 16] | | | | | | | |
| P-GW Address for control plane Length | | | | | | | |
| P-GW Address for control plane [4 . . . 16] | | | | | | | |
| P-GW Address for User Traffic Length | | | | | | | |
| P-GW Address for User Traffic [4 . . . 16] | | | | | | | |

In the description of the present invention, value 182 for the Type indicates the PDP context/bearer context IE of R8 or later versions. However, other values for the Type, such as 183, may also indicate the PDP context/bearer context IE of R8 or later versions. The embodiment of the invention neither limits which value for the Type indicates the PDP context/bearer context IE of R8 or later versions, nor limits the name of the PDP context/bearer context IE of R8 or later versions.

If the source AN is of R7 or earlier versions, the source MMNE carries in the Forward Relocation Request message the PDP context/bearer context IE of R7 or earlier versions. This IE carries the user plane anchor point information of the AN of R7 or earlier versions, such as the address and TEID of the P-GW.

Step 204: The destination MMNE creates the PDP context/bearer context and requests the destination access network element (DANE) to establish radio bearer resource. If the destination AN is the GERAN, the DANE will be a BSC. If the destination AN is the UTRAN, the DANE will be an RNC. If the destination AN is the EUTRAN, the DANE will be an ENodeB.

If the destination AN is of R7 or earlier versions, the destination MMNE processes the PDP context/bearer context IE of R7 or earlier versions in the Forward Relocation Request message to obtain the address and TEID of the GGSN (i.e. the P-GW), and then saves the address and TEID of the GGSN into the created PDP context/bearer context.

If the destination AN is of R8 or later versions and both the PDP context/bearer context IE of R8 or later versions and the PDP context/bearer context IE of R7 or earlier versions are carried in the received Forward Relocation Request message, the destination MMNE will ignore the PDP context/bearer context IE of R7 or earlier versions carried in the Forward Relocation Request message and process the PDP context/bearer context IE of R8 or later versions to obtain the address and TEID information of the S-GW and P-GW, and saves the address and TEID information of the S-GW and P-GW into the created PDP context/bearer context.

If the destination AN is of R8 or later versions and the PDP context/bearer context IE of R7 or earlier versions is carried in the received Forward Relocation Request message, the destination MMNE will process the PDP context/bearer context IE of R7 or earlier versions to obtain the address and TEID of the GGSN (i.e. the P-GW), and save the address and TEID of the GGSN into the created PDP context/bearer context. Meanwhile, the destination MMNE selects an S-GW for the UE, and steps 205 and 206 are executed.

The destination MMNE may select an S-GW from an S-GW list configured therein. Naturally, the S-GW may also be selected in other ways which will not be defined here.

Step 205: The destination MMNE transmits a Create Bearer Request to the selected S-GW.

Step 206: The destination MMNE receives a Create Bearer Request Response message from the S-GW.

With steps 205 and 206, the S-GW creates the PDP context/bearer context for the UE, and the destination MMNE saves the IP address and TEID of the S-GW into the PDP context/bearer context created by the destination MMNE.

Step 207: The destination MMNE transmits a Forward Relocation Response message to the source MMNE. The destination MMNE may inform the source MMNE of the version of the destination AN, for example, the destination AN is of R8 or later versions or of R7 or earlier versions.

The destination MMNE of R8 or later versions carries the version information of the destination AN in the Forward Relocation Response message. The version information may be carried in various manners. For example, the version information may be carried by setting a binary indication bit IE which indicates a destination AN of R7 or earlier versions when it is set to 0 and indicates a destination AN of R8 or later versions when it is set to 1. Alternatively, the version information may be carried by setting an S-GW Change Indication IE to inform the source MMNE whether the S-GW used by the UE has changed. Or alternatively, other indication elements may be carried in the response message as well. The destination MMNE of R7 or earlier versions does not carry any indication IE for indicating the version information in the Forward Relocation Response message.

If there is no version information carried in the Forward Relocation Response message or the version information indicates a destination AN of R7 or earlier versions, the source MMNE will take the destination AN as being of R7 or earlier versions. If there is version information carried in the Forward Relocation Response message or the version information indicates a destination AN of R8 or later versions, the source MMNE will take the destination AN as being of R8 or later versions.

Step 208: The source MMNE transmits a Relocation Command to the SANE.

Step 209: The SANE transmits a Handover Command to the UE.

Step 210: The UE hands over to the destination AN and initiates a Handover Complete message to the destination MMNE.

If the destination AN is of R8 or later versions, steps 211 to 214 will be executed. If the destination AN is of R7 or earlier versions, steps 215 to 216 will be executed.

Step 211: The destination MMNE transmits an Update Bearer Request message to the S-GW.

Step 212: The S-GW forwards the Update Bearer Request message to a P-GW.

Step 213: The P-GW replies with an Update Bearer Response message to the S-GW.

Step 214: The S-GW forwards the Update Bearer Response message to the destination MMNE.

Step 215: The destination MMNE transmits an Update Bearer Request message to the P-GW.

Step 216: The P-GW replies with an Update Bearer Response message to the destination MMNE.

If the source AN is of R8 or later versions and the destination AN is of R7 or earlier version, steps 217 to 218 will be executed.

Step 217: The source MMNE transmits a Delete Bearer Request message to the S-GW.

Step 218: The S-GW deletes the bearer resource used by the UE and then replies with a Delete Bearer Response message to the source MMNE.

Embodiment Two

The inter/intra-system handover procedure is similar to steps 201, 202 and steps 205 to 218 of Embodiment One. The difference lies in that, the IEs that carry the user plane anchor point are different; in other words, steps 203 and 204 in Embodiment Two are different from that in Embodiment One.

Here in step 203, the source MMNE transmits a Forward Relocation Request message to the destination MMNE.

If the source AN is of R8 or later versions, the source MMNE extends the original PDP context/bearer context IE of R7 or earlier versions. That is, S-GW information used by the AN of R8 or later versions is added to the PDP context/bearer context IE of R7 or earlier versions and the extended PDP context/bearer context IE of R7 or earlier versions is transmitted in the Forward Relocation Request message. The user plane anchor point information of the AN of R8 or later versions is carried in the extended IE, and the user plane anchor point information of the AN of R7 or earlier versions is carried in the primary portion of the extended IE, that is, in the PDP context/bearer context IE of R7 or earlier versions.

The IE formed by extending the original PDP context/bearer context IE of R7 or earlier versions is as shown in the following table, where the GGSN is the P-GW described herein.

| 8 | 7 | 6 | 5 | 4 | 3 | 2 | 1 |
|---|---|---|---|---|---|---|---|
| Type = 130 (Decimal) | | | | | | | |
| Length | | | | | | | |
| Uplink Tunnel Endpoint Identifier Control Plane | | | | | | | |
| Uplink Tunnel Endpoint Identifier Data I | | | | | | | |
| GGSN Address for control plane Length | | | | | | | |
| GGSN Address for control plane [4 . . . 16] | | | | | | | |
| GGSN Address for User Traffic Length | | | | | | | |
| GGSN Address for User Traffic [4 . . . 16] | | | | | | | |
| Uplink S-GW Tunnel Endpoint Identifier Control Plane | | | | | | | |
| Uplink S-GW Tunnel Endpoint Identifier Data I | | | | | | | |
| S-GW Address for control plane Length | | | | | | | |
| S-GW Address for control plane [4 . . . 16] | | | | | | | |
| S-GW Address for User Traffic Length | | | | | | | |
| S-GW Address for User Traffic [4 . . . 16] | | | | | | | |

If the source AN is of R7 or earlier versions, the source MMNE carries in the Forward Relocation Request message the user plane anchor point information of the AN of R7 or earlier versions, such as the address and TEID of the P-GW, in the PDP context/bearer context IE of R7 or earlier versions.

Here in step 204, the destination MMNE creates the PDP context/bearer context and requests the DANE to establish radio bearer resource.

If the destination AN is of R7 or earlier versions and the received message is the extended IE formed by extending the PDP context/bearer context IE of R7 or earlier versions, the destination MMNE processes the primary portion of the extended IE, that is, the PDP context/bearer context IE of R7 or earlier versions, to obtain the address and TEID of the GGSN (i.e. the P-GW), and then saves the address and TEID of the GGSN into the created PDP context/bearer context.

If the destination AN is of R7 or earlier versions and the received message is the PDP context/bearer context IE of R7 or earlier versions, the destination MMNE processes the PDP context/bearer context IE of R7 or earlier versions to obtain the address and TEID of the GGSN (i.e. the P-GW), and then saves the address and TEID of the GGSN into the created PDP context/bearer context.

If the destination AN is of R8 or later versions and the received message is the extended IE formed by extending the PDP context/bearer context IE of R7 or earlier versions, the destination MMNE processes the whole extended IE formed by extending the PDP context/bearer context IE of R7 or earlier versions to obtain the address and TEID of the S-GW and P-GW, and saves the address and TEID of the S-GW and P-GW into the created PDP context/bearer context.

If the destination AN is of R8 or later versions and the received message is the PDP context/bearer context IE of R7 or earlier versions, the destination MMNE processes the PDP context/bearer context IE of R7 or earlier versions to obtain the address and TEID of the GGSN (i.e. the P-GW), and saves the address and TEID of the GGSN into the created PDP context/bearer context. Meanwhile, the destination MMNE selects an S-GW for the UE, and steps 205 and 206 are executed.

Here the selection of the S-GW by the destination MMNE is the same as that in Embodiment One.

Embodiment Three

The inter/intra-system handover procedure is similar to steps 201, 202 and steps 205 to 218 of Embodiment One. The difference lies in that, the IEs that carry the user plane anchor point information are different; in other words, steps 203 and 204 in Embodiment Three are different from that in Embodiment One.

Here in step 203, the source MMNE transmits a Forward Relocation Request message to the destination MMNE.

If the source AN is of R8 or later versions, the source MMNE generates an extended PDP context/bearer context IE of R8 or later versions. That is, the S-GW information used by the AN of R8 or later versions is taken as an IE and two PDP context/bearer context IEs, i.e. the existing PDP context/bearer context IE of R7 or earlier versions and the extended PDP context/bearer context IE of R8 or later versions, are carried in the Forward Relocation Request message. Here, the user plane anchor point information, of both the AN of R8 or later versions and the AN of R7 or earlier versions, such as the address and TEID of the P-GW, is carried in the PDP context/bearer context IE of R7 or earlier versions, and the user plane anchor point information of the AN of R8 or later versions, such as the address and TEID of the S-GW, is carried in the PDP context/bearer context IE of R8 or later versions.

The extended PDP context/bearer context IE of R8 or later versions includes the IEs as shown in the following table:

| 8 | 7 | 6 | 5 | 4 | 3 | 2 | 1 |
|---|---|---|---|---|---|---|---|
| Type = 182 (Decimal) | | | | | | | |
| Length | | | | | | | |
| Uplink S-GW Tunnel Endpoint Identifier Control Plane | | | | | | | |
| Uplink S-GW Tunnel Endpoint Identifier Data I | | | | | | | |
| S-GW Address for control plane Length | | | | | | | |
| S-GW Address for control plane [4 . . . 16] | | | | | | | |
| S-GW Address for User Traffic Length | | | | | | | |
| S-GW Address for User Traffic [4 . . . 16] | | | | | | | |

In the description of the embodiment of the present invention, value 182 for the Type indicates the extended PDP context/bearer context IE of R8 or later versions. However, other values for the Type, such as 183, may also indicate the extended PDP context/bearer context IE of R8 or later versions. The embodiment of the invention neither limits which value for the Type indicates the extended PDP context/bearer context IE of R8 or later versions, nor limits the name of the extended PDP context/bearer context IE of R8 or later versions.

If the source AN is of R7 or earlier versions, the source MMNE carries in the Forward Relocation Request message the PDP context/bearer context IE of R7 or earlier versions. The source MMNE carries the user plane anchor point information of the AN of R7 or earlier versions, such as the address and TEID of the P-GW, in the PDP context/bearer context IE of R7 or earlier versions.

Here in step 204, the destination MMNE creates the PDP context/bearer context and requests the DANE to establish radio bearer resource.

If the destination AN is of R7 or earlier versions and both the PDP context/bearer context IE of R7 or earlier versions and the extended PDP context/bearer context IE of R8 or later versions are carried in the received message, the destination MMNE processes the PDP context/bearer context IE of R7 or earlier versions to obtain the address and TEID of the GGSN (i.e. the P-GW), and then saves the address and TEID of the GGSN into the created PDP context/bearer context.

If the destination AN is of R7 or earlier versions and the PDP context/bearer context IE of R7 or earlier versions is carried in the received message, the destination MMNE processes the PDP context/bearer context IE of R7 or earlier versions to obtain the address and TEID of the GGSN (i.e. the P-GW), and then saves the address and TEID of the GGSN into the created PDP context/bearer context.

If the destination AN is of R8 or later versions and both the PDP context/bearer context IE of R7 or earlier versions and the extended PDP context/bearer context IE of R8 or later versions are carried in the received message, the destination MMNE processes both the PDP context/bearer context IE of R7 or earlier versions and the extended PDP context/bearer context IE of R8 or later versions to obtain the address and TEID of the S-GW and P-GW, and saves the address and TEID of the S-GW and P-GW into the created PDP context/bearer context.

If the destination AN is of R8 or later versions and the PDP context/bearer context IE of R7 or earlier versions is carried in the received message, the destination MMNE processes the PDP context/bearer context IE of R7 or earlier versions to obtain the address and TEID of the GGSN (i.e. the P-GW), and saves the address and TEID of the GGSN into the created PDP context/bearer context. Meanwhile, the destination MMNE selects an S-GW for the UE, and steps 205 and 206 are executed.

The selection of the S-GW by the destination MMNE is the same as that in Embodiment One.

Embodiment Four

Figure 3:
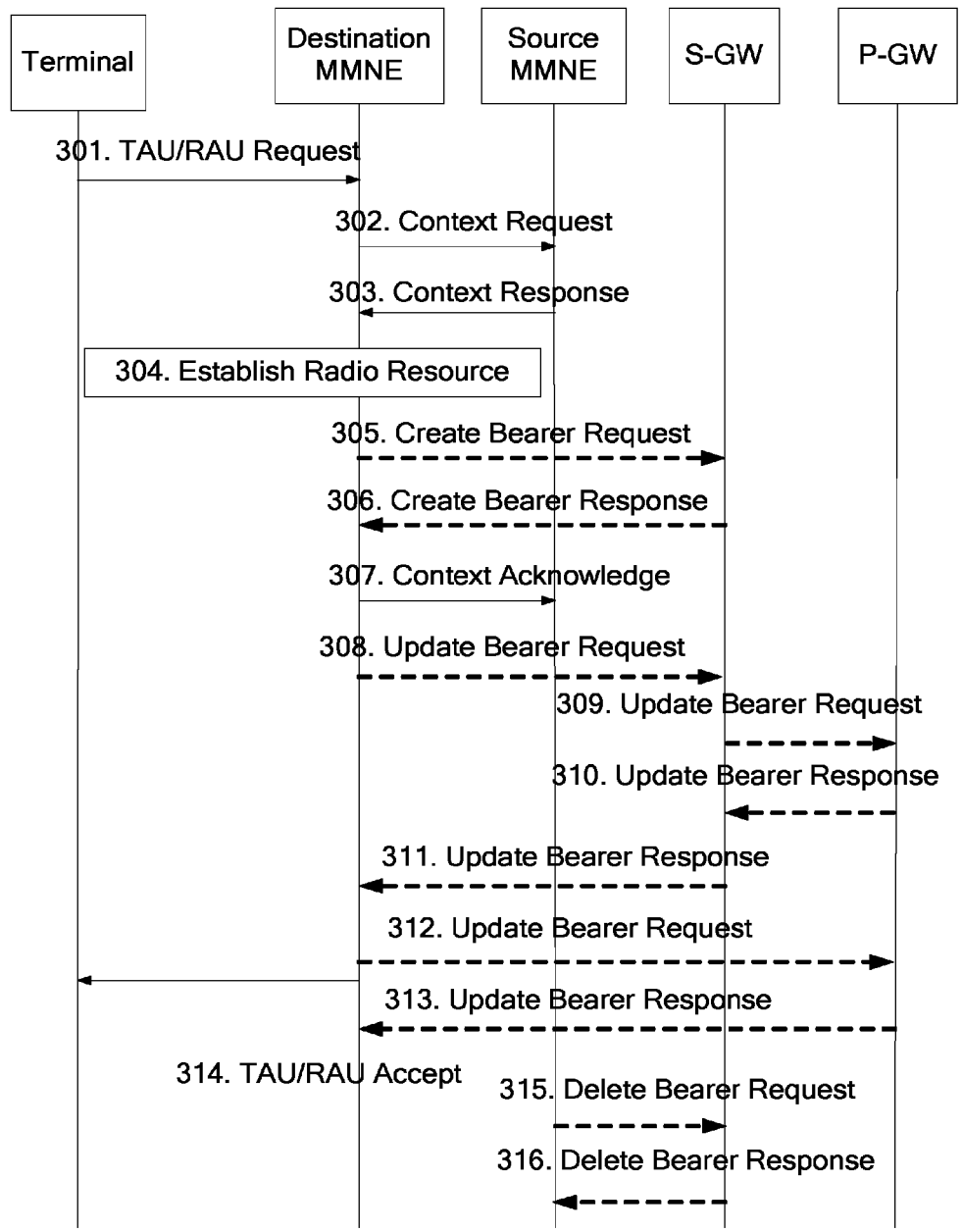
FIG. 3 is a flow chart of a user plane anchor point processing method for realizing handover between ANs of different versions according to a fourth embodiment of the invention.

The three methods for the user plane anchor point described above may also be applied to the inter/intra-system change. FIG. 3 is a flow chart illustrating the implementation of change between ANs of different versions using the processing method for the user plane anchor point according to an embodiment of the invention. As shown in FIG. 3, the method mainly includes the following steps.

Step 301: A UE transmits a Tracking Area Update (TAU) or Route Area Update (RAU) Request message to a destination MMNE. If a destination AN is the GERAN/UTRAN, the UE transmits the RAU request message to an SGSN. If the destination AN is the E-UTRAN, the UE transmits the TAU request message to an MME.

Step 302: The destination MMNE transmits a Context Request message to a source MMNE to obtain the context information created by the UE at the source access system. If the source AN is the GERAN/UTRAN, the source MMNE is an SGSN. If the source AN is the EUTRAN, the source MMNE is an MME.

Step 303: The source MMNE transmits a Context Response message to the destination MMNE. If the destination AN is the GERAN/UTRAN, the destination MMNE is the SGSN. If the destination AN is the EUTRAN, the destination MMNE is the MME.

If the source AN is of R8 or later versions, the source MMNE carries in the Context Response message two PDP context/bearer context IEs. One of the PDP context/bearer context IEs is a PDP context/bearer context IE of R8 or later versions, the other PDP context/bearer context IE is a PDP context/bearer context IE of R7 or earlier versions. The PDP context/bearer context IE of R8 or later versions carries the user plane anchor point information of the AN of R8 or later versions, such as address and TEID information of the S-GW and address and TEID information of the P-GW. The PDP context/bearer context IE of R7 or earlier versions carries the user plane anchor point information of the AN of R7 or earlier versions, such as address and TEID information of the P-GW.

If the source AN is of R7 or earlier versions, the source MMNE carries in the Context Response message the PDP context/bearer context IE of R7 or earlier versions. This IE carries the user plane anchor point information of the AN of R7 or earlier versions, such as address and TEID of the P-GW.

Step 304: The destination MMNE creates the PDP context/bearer context. The destination MMNE may perform the following processing.

If the destination AN is of R7 or earlier versions, the destination MMNE processes the PDP context/bearer context IE of R7 or earlier versions to obtain the address and TEID of the GGSN (i.e. the P-GW), and then saves the address and TEID of the GGSN into the created PDP context/bearer context.

If the destination AN is of R8 or later versions and both the PDP context/bearer context IE of R8 or later versions and the PDP context/bearer context IE of R7 or earlier versions are carried in the received message, the destination MMNE will ignore the PDP context/bearer context IE of R7 or earlier versions carried in the Context Response message and process the PDP context/bearer context IE of R8 or later versions to obtain the address and TEID of the S-GW and P-GW, and save the address and TEID of the S-GW and P-GW into the created PDP context/bearer context.

If the destination AN is of R8 or later versions and the PDP context/bearer context IE of R7 or earlier versions is carried in the received message, the destination MMNE processes the PDP context/bearer context IE of R7 or earlier versions to obtain the address and TEID of the GGSN (i.e. the P-GW), and saves the address and TEID of the GGSN into the created PDP context/bearer context. Meanwhile, the destination MMNE selects an S-GW for the UE, and steps 305 and 306 are executed.

The selection of the S-GW by the destination MMNE is the same as that in Embodiment One.

Step 305: The destination MMNE transmits a Create Bearer Request message to the selected S-GW.

Step 306: The destination MMNE receives a Create Bearer Request Response message from the S-GW.

With steps 305 and 306, the S-GW creates the PDP context/bearer context for the UE. Meanwhile, the destination MMNE saves the IP address and TEID of the S-GW into the PDP context/bearer context created by the destination MMNE.

Step 307: The destination MMNE replies with a Context Response message to the source MMNE. The destination MMNE needs to inform the source MMNE of the version of the destination AN, such as R8 or later versions or R7 or earlier version. The detailed procedure is as follows:

The destination MMNE of R8 or later versions carries the version information in the Context Response message. The way of carrying the version information is the same as that in Embodiment One.

If the destination AN is of R8 or later versions, steps 308 to 311 will be executed. If the destination AN is of R7 or earlier versions, steps 312 to 313 will be executed.

Step 308: The destination MMNE transmits an Update Bearer Request message to the S-GW.

Step 309: The S-GW transmits the Update Bearer Request message to the P-GW.

Step 310: The P-GW replies with an Update Bearer Response message to the S-GW.

Step 311: The S-GW replies with the Update Bearer Response message to the destination MMNE.

Step 312: The destination MMNE transmits an Update Bearer Request message to the P-GW.

Step 313: The P-GW replies with an Update Bearer Response message to the destination MMNE.

Step 314: The destination MMNE replies with a TAU or RAU Accept message to the UE. If the destination AN is the GERAN/UTRAN, the SGSN transmits the RAU Accept message to the UE. If the destination AN is the EUTRAN, the MME transmits the TAU Accept message to the UE.

If the source AN is of R8 or later versions and the destination AN is of R7 and the earlier versions, steps 315 and 316 are executed.

Step 315: The source MMNE transmits a Delete Bearer Request message to the S-GW.

Step 316: The S-GW deletes the bearer resource used by the UE and then replies with a Delete Bearer Response message to the source MMNE.

Embodiment Five

The inter/intra-system change procedure is similar to steps 301 and 302, steps 305 to 316. The difference lies in that, the IEs that carry the user plane anchor point are different; in other words, steps 303 and 304 in Embodiment Five are different from that in Embodiment Four.

Here in step 303, the source MMNE transmits a Context Response message to the destination MMNE. If the source AN is of R8 or later versions, the source MMNE extends the PDP context/bearer context IE of R7 or earlier versions. That is, the S-GW information is added into the PDP context/bearer context IE of R7 or earlier versions, and the extended PDP context/bearer context IE of R7 or earlier versions are transmitted in the Context Response message. The user plane anchor point information of the AN of R8 or later versions, such as the address and TEID information of the S-GW and P-GW, is carried in the extended PDP context/bearer context IE of R7 or earlier versions and the user plane anchor point information of the AN of R7 or earlier versions, such as the address and TEID information of the P-GW, is carried in the primary portion of the extended IE, that is, in the PDP context/bearer context IE of R7 or earlier versions.

If the source AN is of R7 or earlier versions, the source MMNE carries in the Context Response message the user plane anchor point information of the AN of R7 or earlier versions, such as the address and TEID of the P-GW, in the PDP context/bearer context IE of R7 or earlier versions.

Here in step 304, the destination MMNE creates the PDP context/bearer context.

If the destination AN is of R7 or earlier versions and the received message is the extended IE formed by extending the PDP context/bearer context IE of R7 or earlier versions, the destination MMNE processes the primary portion of the extended IE, that is, the PDP context/bearer context IE of R7 or earlier versions, to obtain the address and TEID of the GGSN (i.e. the P-GW), and then saves the address and TEID of the GGSN into the created PDP context/bearer context.

If the destination AN is of R7 or earlier versions and the received message is the PDP context/bearer context IE of R7 or earlier versions, the destination MMNE processes the PDP context/bearer context IE of R7 or earlier versions to obtain the address and TEID of the GGSN (i.e. the P-GW), and then saves the address and TEID of the GGSN into the created PDP context/bearer context.

If the destination AN is of R8 or later versions and the received message is the extended IE formed by extending the PDP context/bearer context IE of R7 or earlier versions, the destination MMNE processes the extended IE formed by extending the PDP context/bearer context IE of R7 or earlier versions to obtain the address and TEID of the S-GW and P-GW, and saves the address and TEID of the S-GW and P-GW into the created PDP context/bearer context.

If the destination AN is of R8 or later versions and the received message is the PDP context/bearer context IE of R7 or earlier versions, the destination MMNE processes the PDP context/bearer context IE of R7 or earlier versions to obtain the address and TEID of the GGSN (i.e. the P-GW), and saves the address and TEID of the GGSN into the created PDP context/bearer context. Meanwhile, the destination MMNE selects an S-GW for the UE, and the process proceeds to steps 305 and 306.

Embodiment Six

The inter/intra-system change procedure is similar to steps 301 and 302, steps 305 to 316 in Embodiment Four. The difference lies in that, the IEs that carry the user plane anchor point; in other words, steps 303 and 304 in Embodiment Six are different from that in Embodiment Four.

Here in step 303, the source MMNE transmits a Context Response message to the destination MMNE. If the source AN is of R8 or later versions, the source MMNE generates an extended PDP context/bearer context IE of R8 or later versions. That is, the S-GW information used by the AN of R8 or later versions is taken as an IE and two PDP context/bearer context IEs, i.e. the existing PDP context/bearer context IE of R7 or earlier versions and the extended PDP context/bearer context IE of R8 or later versions, are carried in the Context Response message. The source MMNE carries in the PDP context/bearer context IE of R7 or earlier versions the user plane anchor point information of both the AN of R8 or later versions and the AN of R7 or earlier versions, such as address and TEID information of the P-GW, and carries in the PDP context/bearer context IE of R8 or later version the user plane anchor point information of the AN of R8 or later versions, such as address and TEID information of the S-GW.

If the source AN is of R7 or earlier versions, the source MMNE carries in the Context Response message the PDP context/bearer context IE of R7 or earlier versions. The source MMNE carries the user plane anchor point information of the AN of R7 or earlier versions, such as the address and TEID of the P-GW, in the PDP context/bearer context IE of R7 or earlier versions.

Here in step 304, the destination MMNE creates the PDP context/bearer context and requests the DANE to establish radio bearer resource.

If the destination AN is of R7 or earlier versions and both the PDP context/bearer context IE of R7 or earlier versions and the extended PDP context/bearer context IE of R8 or later versions are carried in the received message, the destination MMNE processes the PDP context/bearer context IE of R7 or earlier versions to obtain the address and TEID of the GGSN (i.e. the P-GW), and then saves the address and TEID of the GGSN into the created PDP context/bearer context.

If the destination AN is of R7 or earlier versions and the PDP context/bearer context IE of R7 or earlier versions is carried in the received message, the destination MMNE processes the PDP context/bearer context IE of R7 or earlier versions to obtain the address and TEID of the GGSN (i.e. the P-GW), and then saves the address and TEID of the GGSN into the created PDP context/bearer context.

If the destination AN is of R8 or later versions and both the PDP context/bearer context IE of R7 or earlier versions and the extended PDP context/bearer context IE of R8 or later versions are carried in the received message, the destination MMNE processes both the PDP context/bearer context IE of R7 or earlier versions and the extended PDP context/bearer context IE of R8 or later versions to obtain the address and TEID of the S-GW and P-GW, and saves the address and TEID of the S-GW and P-GW into the created PDP context/bearer context.

If the destination AN is of R8 or later versions and the PDP context/bearer context IE of R7 or earlier versions is carried in the received message, the destination MMNE processes the PDP context/bearer context IE of R7 or earlier versions to obtain the address and TEID of the GGSN (i.e. the P-GW), and saves address and TEID of the GGSN into the created PDP context/bearer context. Meanwhile, the destination MMNE selects an S-GW for the UE, and steps 305 and 306 are executed.

The selection of the S-GW by the destination MMNE is the same with that in Embodiment One.

In another embodiment of the invention, when the source AN is of a higher version, it is determined the version number of the GPRS Tunneling Protocol (GTP) used between the source AN and the destination AN. If the GTP is GTPV2, it shows that the destination AN is of R8 or later versions. If the GTP is GTPv0 or GTPv1, it shows that the destination AN is of R7 or earlier versions.

When the source AN finds that the GTP version number for the destination AN is GTPv2, it transmits the S-GW and P-GW information to the destination AN. When the source AN finds that the GTP for the destination AN is GTPv1 or GTPv0, it transmits the P-GW information to the destination AN.

The mechanism of finding the GTP version number for the destination AN by the source AN is the same as that described in 3GPP TS 29.060. The source AN transmits a GTP version number detecting message such as Echo Request message to the destination AN. The destination AN then replies with an Echo Response message to the source AN. With the interaction of the messages, the source AN and destination AN get to know whether the GTP version number of the peer endpoint AN is GTPv2, GTPv1 or GTPv0.

Embodiment Seven

The inter/intra-system handover procedure is similar to steps 201, 202 and steps 205 to 218 of Embodiment One. The difference lies in that, the IEs that carry the user plane anchor point are different, that is to say, steps 203 and 204 in Embodiment Seven are different from that in Embodiment One.

Here in step 203, the source MMNE transmits a Forward Relocation Request message to the destination MMNE.

If the source AN is of R8 or later versions, the source MMNE determines the version number of GTP used between the source MMNE and the destination MMNE. If the GTP is GTPv2, the source MMNE carries both the S-GW information, such as the address and TEID information of the S-GW, and the P-GW information, such as the address and TEID information of the P-GW, in the Forward Relocation Request message. If the GTP version number is GTPv1 or GTPv0, the source MMNE carries the P-GW information, such as the address and TEID information of the P-GW, in the Forward Relocation Request message.

If the source AN is of R7 or earlier versions, the source MMNE carries the P-GW information, such as the address and TEID information of the P-GW, in the Forward Relocation Request message.

Here in step 204, the destination MMNE creates the PDP context/bearer context and requests the DANE to establish radio bearer resource.

If the destination AN is of R7 or earlier versions, the destination MMNE obtains the IP address and TEID information of the GGSN (i.e. the P-GW) from the Forward Relocation Request message, and saves the IP address and TEID information of the GGSN into the created PDP context/bearer context.

If the destination AN is of R8 or later versions and both the S-GW information and the P-GW information are carried in the received Forward Relocation Request message, the destination MMNE obtains the address and TEID information of the S-GW and P-GW from the Forward Relocation Request message, and saves the address and TEID information of the S-GW and P-GW into the created PDP context/bearer context.

If the destination AN is of R8 or later versions and the P-GW information is carried in the received Forward Relocation Request message, the destination MMNE obtains the IP address and TEID information of the GGSN (i.e. the P-GW) from the Forward Relocation Request message, and saves the IP address and TEID information of the GGSN into the created PDP context/bearer context. Meanwhile, the destination MMNE selects an S-GW for the UE, and steps 205 and 206 are executed.

Embodiment Eight

The inter/intra-system change procedure is similar to steps 301, 302 and steps 305 to 316 of Embodiment Four. The difference lies in that, the IEs that carry the user plane anchor point information are different; in other words, steps 303 and 304 in Embodiment Eight are different from that in Embodiment Four.

Here in step 303, the source MMNE transmits a Context Response message to the destination MMNE. If the source AN is of R8 or later versions, the source MMNE determines the version number of the GTP used between the source MMNE and the destination MMNE. If the GTP version number is GTPv2, the source MMNE carries both the S-GW information, such as the address and TEID information of the S-GW, and the P-GW information, such as the address and TEID information of the P-GW, in the Context Response message. If the GTP version number is GTPv1 or GTPv0, the source MMNE carries the P-GW information, such as the address and TEID information of the P-GW, in the Context Response message.

If the source AN is of R7 or earlier versions, the source MMNE carries the P-GW information, such as the address and TEID information of the P-GW, in the Context Response message.

Here in step 304, the destination MMNE creates the PDP context/bearer context.

If the destination AN is of R7 or earlier versions, the destination MMNE obtains the IP address and TEID information of the GGSN (i.e. the P-GW) from the Context Response message, and saves the IP address and TEID information of the GGSN into the created PDP context/bearer context.

If the destination AN is of R8 or later versions and both the S-GW information and the P-GW information are carried in the received Context Response message, the destination MMNE obtains the address and TEID information of the S-GW and P-GW from the Context Response message, and saves the address and TEID information of the S-GW into the created PDP context/bearer context.

If the destination AN is of R8 or later versions and the P-GW information is carried in the received Context Response message, the destination MMNE obtains the IP address and TEID information of the GGSN (i.e. the P-GW) from the Context Response message, and saves the IP address and TEID information of the GGSN into the created PDP context/bearer context. Meanwhile, the destination MMNE selects an S-GW for the UE, and steps 305 and 306 are executed.

When the inter/intra-system change or handover occurs, the source AN further needs to transmit information such as QoS to the destination AN in the Forward Relocation Request or Context Response message, that is to say, the user information in this case is other information such as QoS. If the source AN is of a lower version, such as R7 or earlier versions nowadays, the source AN transmits the QoS information in the format of R7 or earlier versions. If the source AN is of a higher version, such as R8 or later versions nowadays, the source AN transmits both the QoS information in the format of R7 or earlier versions and the QoS information in the format of R8 or later versions. Thus, no matter which version the destination AN is of, the necessary QoS information can always be identified.

Embodiment Nine

When a source AN is of higher version, such as R8 or later versions nowadays, the source AN transmits to a destination AN two PDP context/bearer context IEs. One of the IEs is a PDP context/bearer context of R8 or later versions, which carries the QoS information in the format of R8 or later versions. The other is a PDP context/bearer context of R7 or earlier versions, which carries the QoS information in the format of R7 or earlier versions.

The destination AN receives the PDP context/bearer context IEs. If the destination AN is of R8 or later versions, it processes the PDP context/bearer context IE of R8 or later versions to obtain the needed information such as QoS. If the destination AN is of R7 or earlier versions, it ignores the PDP context/bearer context IE of R8 or later versions and processes the PDP context/bearer context IE of R7 or earlier versions to obtain the needed information such as QoS.

When the source AN is of a lower version, the source AN transmits information such as QoS in the format of R7 or earlier versions, that is, transmits PDP context/bearer context IE of R7 or earlier versions which carries the information such as QoS in the format of R7 or earlier versions.

In this case, no matter which version the destination AN is of, the information such as QoS in the format of R7 or earlier versions carried in the PDP context/bearer context IE may be identified directly.

Embodiment Ten

If a source AN is of R8 or later versions, a source MMNE extends the original PDP context/bearer context IE of R7 or earlier versions. That is, distinction information between the information such as QoS of R8 or later versions and that of R7 or earlier versions is added to the PDP context/bear context IE of R7 or earlier versions. When the message is forwarded, the extended IE formed by extending the PDP context/bear context IE of R7 or earlier versions is transmitted.

A destination AN receives the PDP context/bearer context IE. If the destination AN is of R8 or later versions, it processes the extended IE formed by extending the PDP context/bearer context IE of R7 or earlier versions to obtain the needed information such as QoS. If the destination AN is of R7 or earlier versions, it processes the primary portion of the extended IE, that is, the PDP context/bearer context IE of R7 or earlier versions, to obtain the needed information such as QoS.

When the source AN is of R7 or earlier versions, the processing is the same as that in Embodiment Nine.

Embodiment Eleven

If a source AN is of R8 or later versions, a source MMNE generates an extended PDP context/bearer context IE of R8 or later versions, which is an IE formed from the distinction information between the information such as QoS of R8 or later versions and that of R7 or earlier versions. When the message is forwarded, two PDP context/bearer context IEs, i.e. the present PDP context/bearer context IE of R7 or earlier versions and the extended PDP context/bearer context IE of R8 or later versions, are transmitted. The PDP context/bearer context IE of R7 or earlier versions carries information such as QoS in the format of R7 or earlier versions and the extended PDP context/bearer context IE of R8 or later versions carries the distinction information between the information such as QoS in the format of R8 or later versions and that in the format of R7 or earlier versions.

A destination AN receives the PDP context/bearer context IEs. If the destination AN is of R8 or later versions, it processes both the PDP context/bearer context IE of R7 or earlier versions and the extended PDP context/bearer context IE of R8 or later versions to obtain the needed information such as QoS. If the destination AN is of R7 or earlier versions, it processes the PDP context/bearer context IE of R7 or earlier versions to obtain the needed information such as QoS.

When the source AN is of lower version, the processing is the same as that in Embodiment Nine.

Embodiment Twelve

When a source AN transmits information such as QoS to a destination AN, if the source AN is of higher version, the source AN determines the version number of GTP used between the source AN and the destination AN. If the GTP version number is GTPv2, the source AN transmits to the destination AN the PDP context/bearer context IE of R8 or later versions which carries the information such as QoS in the format of R8 or later versions. Alternatively, if the source AN finds that the GTP version number between the source AN and the destination AN is GTPv1 or GTPv0, the source AN transmits to the destination AN the PDP context/bearer context IE of R7 or earlier versions which carries the information such as QoS in the format of R7 or earlier versions.

Embodiment Thirteen

Figure 4:
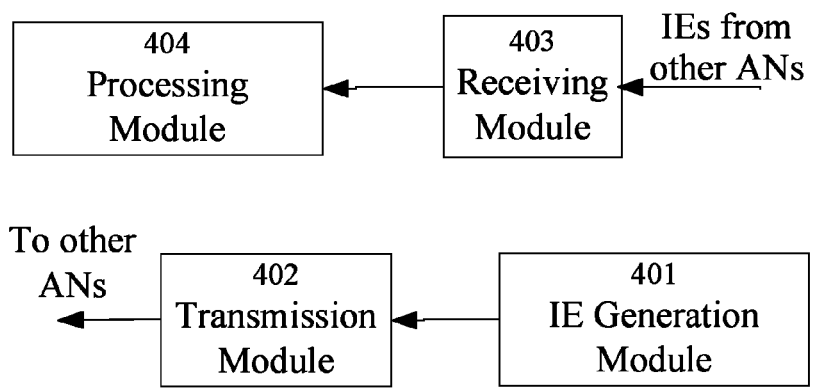
FIG. 4 is a block diagram illustrating a device for realizing information transfer according to a thirteenth embodiment of the invention.

FIG. 4 illustrates the block diagram of a device according to Embodiment Thirteen of the invention, with which a source AN may implement the methods of Embodiments One to Six and Embodiments Nine to Eleven. As shown in FIG. 4, the device mainly includes an IE generation module 401, a transmission module 402, a receiving module 403, and a processing module 404.

Here, the IE generation module 401 generates an IE carrying user information. When the source AN is of a lower version, the user information is user information corresponding to the lower version AN. When the source AN is of a higher version, the user information includes both the user information corresponding to the lower version AN and the user information corresponding to the higher version AN.

The transmission module 402 transmits the IE generated by the IE generation module 401 to a destination AN.

The receiving module 403 receives the IE carrying the user information transmitted from the transmission module 402.

The processing module 404 obtains user information corresponding to the version of a local AN from the IE received by the receiving module 403. When the device is located in a higher version AN, where the user information is the user plane anchor point information and user information coming from the source AN is the user plane anchor point information corresponding to the lower version AN, the processing module 404 selects an S-GW and obtains information of the S-GW.

Embodiment Fourteen

Figure 5:
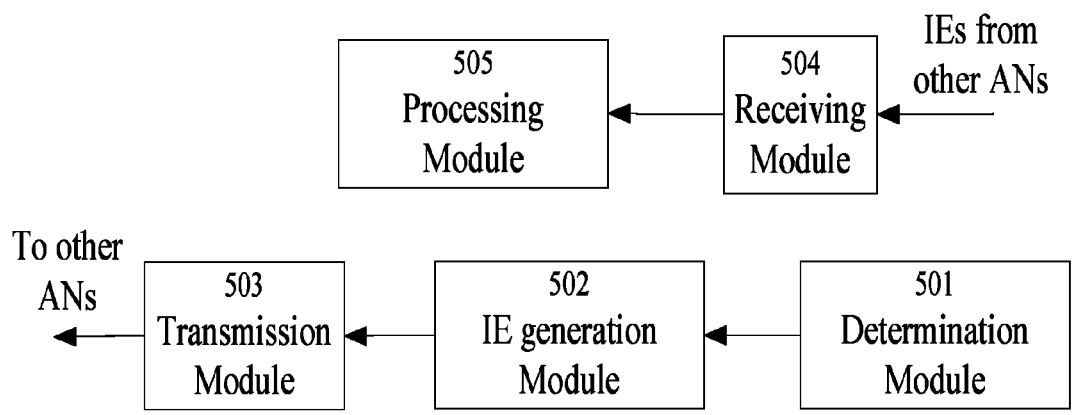
FIG. 5 is a block diagram illustrating a device for realizing information transfer according to a fourteenth embodiment of the invention.

FIG. 5 illustrates the block diagram of a device according to Embodiment Fourteen of the invention, with which a source AN may implement the methods of Embodiments Seven, Eight and Twelve. As shown in FIG. 5, the device mainly includes a determination module 501, an IE generation module 502, a transmission module 503, a receiving module 504, and a processing module 505.

Here, the determination module 501 determines the version number of GTP used between a source AN and a destination AN, and transmits the determination result to the IE generation module 502.

The IE generation module 502 generates an IE carrying user information. If the source AN is of a lower version, the IE generation module 502 generates an IE carrying user information corresponding to the lower version AN. Alternatively, if the source AN is of higher version, the IE generation module 502 generates an IE that carries user information based on the determination result of the determination module 501, so that if the determination result indicates a lower version number, the IE generation module 502 generates an IE carrying user information corresponding to the lower version AN, and if the determination result indicates a higher version number, the IE generation module 502 generates an IE carrying user information corresponding to the higher version AN.

The transmission module 504 transmits the IE that carries user information and is generated by the IE generation module 502 to the destination AN.

The receiving module 504 receives the IE carrying the user information transmitted from the transmission module 503.

The processing module 505 obtains user information corresponding to the version of a local AN from the IE received by the receiving module 504.

When the device is located in a higher version AN, where the user information is the user plane anchor point information and user information coming from the source AN is the user plane anchor point information corresponding to the lower version AN, the processing module 505 selects an S-GW and obtains information of the S-GW.

Some exemplary embodiments of the invention are described above, which is not intended to limit the scope of the disclosure. Any modification, equivalent substitution, and improvement within the spirit and scope of the disclosure are intended to be included in the scope of the disclosure.

What is claimed is:

1. A method, comprising:
    determining, by a source Mobility Management Network Element (MMNE) of a source Access Network (AN), a version number of a General Radio Packet Service (GPRS) Tunneling Protocol (GTP) used between the source MMNE and a destination MMNE of a destination AN; and
    transmitting, by the source MMNE, user information corresponding to the version number of the GTP used between the source MMNE and the destination MMNE to the destination MMNE, wherein when the GTP version number is GTPV2, the user information corresponding to the version number of the GTP is user information corresponding to a higher version AN.

2. The method of claim 1, wherein the user information corresponding to the higher version AN comprises both Packet Data Network Gateway (P-GW) information and Serving Gateway (S-GW) information.

3. The method of claim 2, wherein the P-GW information comprises P-GW address and P-GW Tunnel Endpoint Identity (TEID), the S-GW information comprises S-GW address and S-GW TEID.

4. The method of claim 1, wherein transmitting, by the source MMNE, user information corresponding to the version number of the GTP used between the source MMNE and the destination MMNE to the destination MMNE, comprises:
   transmitting, by the source MMNE, a Forward Relocation Request message to the destination MMNE, the Forward Relocation Request message includes user information corresponding to the version number of the GTP used between the source MMNE and the destination MMNE to the destination MMNE.

5. The method of claim 1, wherein transmitting, by the source MMNE, user information corresponding to the version number of the GTP used between the source MMNE and the destination MMNE to the destination MMNE, comprises:
   transmitting, by the source MMNE, a Context Response message to the destination MMNE, the Context Response message includes user information corresponding to the version number of the GTP used between the source MMNE and the destination MMNE to the destination MMNE.

6. A method, comprising:
   determining, by a source Mobility Management Network Element (MMNE) of a source Access Network (AN), a version number of a General Radio Packet Service (GPRS) Tunneling Protocol (GTP) used between the source MMNE and a destination MMNE of a destination AN; and
   transmitting, by the source MMNE, user information corresponding to the version number of the GTP used between the source MMNE and the destination MMNE to the destination MMNE, wherein when the GTP version number is one of GTPV1 and GTPV0, the user information corresponding to the version number of the GTP is user information corresponding to a lower version AN.

7. The method of claim 6, wherein the user information corresponding to the lower version AN comprises Packet Data Network Gateway (P-GW) information.

8. The method of claim 7, wherein the P-GW information comprises P-GW address and P-GW Tunnel Endpoint Identity (TEID).

9. The method of claim 6,
   wherein transmitting, by the source MMNE, user information corresponding to the version number of the GTP used between the source MMNE and the destination MMNE to the destination MMNE, comprises:
   transmitting, by the source MMNE, a Forward Relocation Request message to the destination MMNE, the Forward Relocation Request message includes user information corresponding to the version number of the GTP used between the source MMNE and the destination MMNE to the destination MMNE.

10. The method of claim 6,
    wherein transmitting, by the source MMNE, user information corresponding to the version number of the GTP used between the source MMNE and the destination MMNE to the destination MMNE, comprises:
    transmitting, by the source MMNE, a Context Response message to the destination MMNE, the Context Response message includes user information corresponding to the version number of the GTP used between the source MMNE and the destination MMNE to the destination MMNE.

11. The method of claim 6,
    wherein when the source AN is the higher version and the destination AN is the lower version, the method further comprises:
    transmitting, by the source MMNE, a Delete Bearer Request message to a Serving Gateway (S-GW);
    deleting, by the S-GW, bearer resource used by a user; and
    returning, by the S-GW, a Delete Bearer Response message to the source MMNE.

12. The method of claim 6,
    wherein when the destination AN is the higher version and the source AN is the lower version, the method further comprises:
    selecting, by the destination MMNE, a Serving Gateway (S-GW);
    transmitting, by the destination MMNE, a Create Bearer Request to the S-GW; and
    receiving, by the destination MMNE, a Create Bearer Request Response message from the S-GW.

13. A source Mobility Management Network Element (MMNE) configured to:
    determine a version number of a General Radio Packet Service (GPRS) Tunneling Protocol (GTP) used between the source MMNE and a destination MMNE;
    transmit user information corresponding to the version number of the GTP used between the source MMNE and the destination MMNE to the destination MMNE; and
    transmit a Forward Relocation Request message to the destination MMNE, and
    wherein the Forward Relocation Request message includes the user information corresponding to the version number of the GTP used between the source MMNE and the destination MMNE.

14. The source MMNE of claim 13, wherein the Forward Relocation Request message includes the user information corresponding to the version number of the GTP used between the source MMNE and the destination MMNE.

* * * * *